W. H. McGINNIS AND C. H. BAXTER.
CHUTE FOR LOADING AND UNLOADING LIVE STOCK, ESPECIALLY HOGS AND SHEEP.
APPLICATION FILED SEPT. 11, 1916.
1,332,132.
Patented Feb. 24, 1920.
2 SHEETS—SHEET 2.
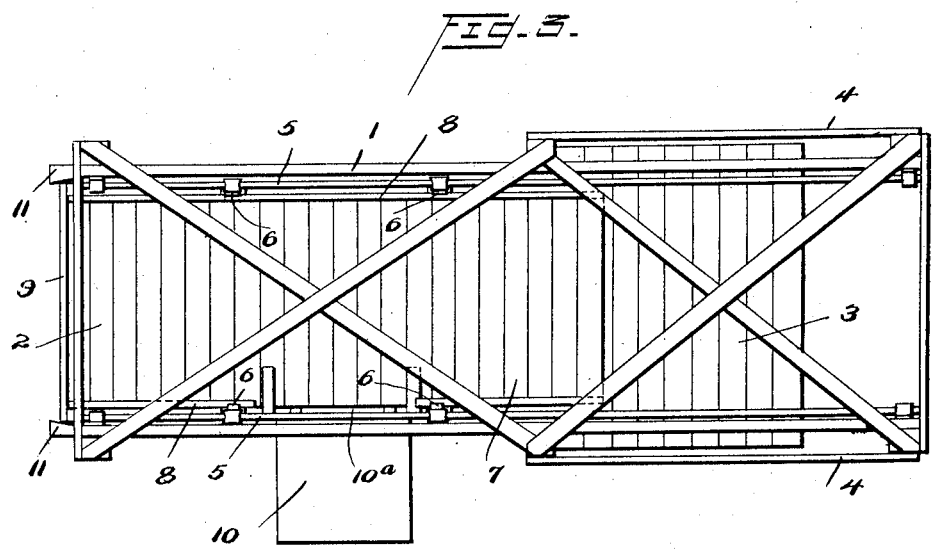
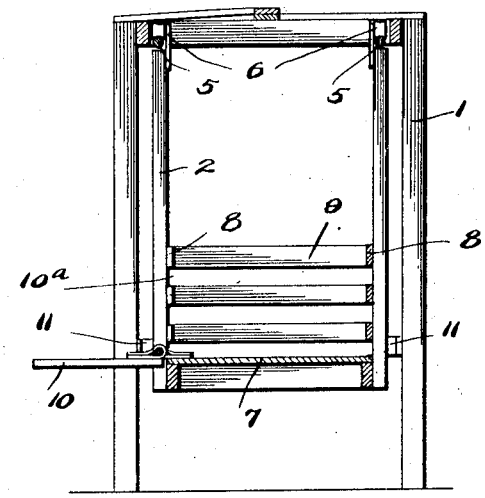
Inventor
William H. McGinnis
Charles H. Baxter
Witness
Harold Stens
By
W. B. Joyner.
Attorney

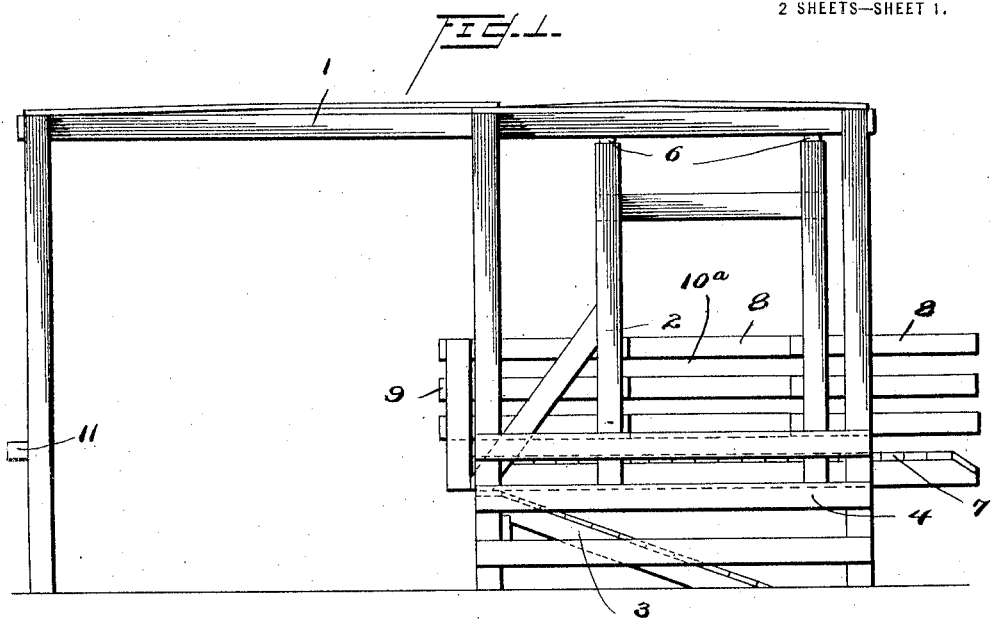
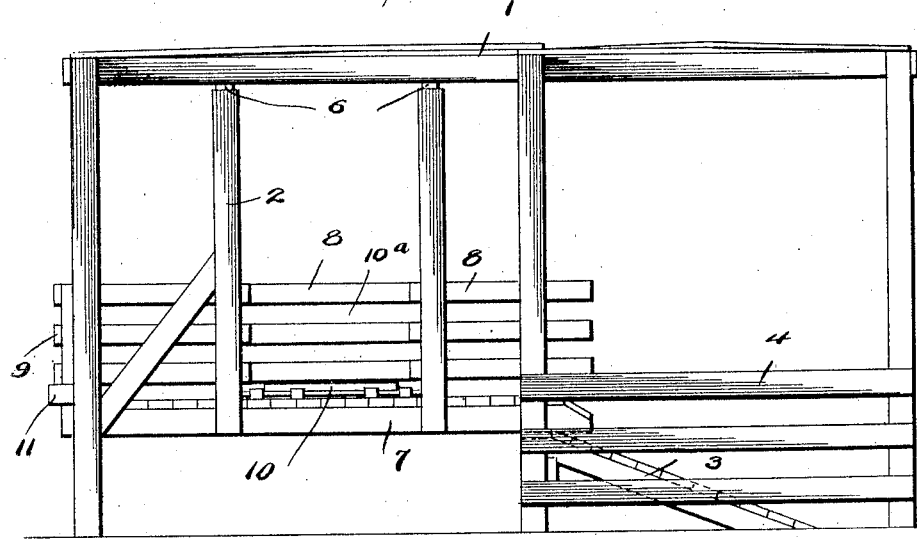

UNITED STATES PATENT OFFICE.

WILLIAM H. McGINNIS AND CHARLES H. BAXTER, OF POWHATTAN, KANSAS.

CHUTE FOR LOADING AND UNLOADING LIVE STOCK, ESPECIALLY HOGS AND SHEEP.

1,332,132.   Specification of Letters Patent.   Patented Feb. 24, 1920.

Application filed September 11, 1916. Serial No. 119,436.

*To all whom it may concern:*

Be it known that we, WILLIAM H. McGINNIS and CHARLES H. BAXTER, citizens of the United States, residing at Powhattan, in the county of Brown and State of Kansas, have invented certain new and useful Improvements in Chutes for Loading and Unloading Live Stock, Especially Hogs and Sheep, of which the following is a specification.

This invention relates to a chute for loading and unloading live stock, especially hogs and sheep.

It may be employed either in connection with a car or wagon.

The main object of the invention is a device of this kind which will facilitate loading or unloading, reduce the amount of time and work usually required, and automatically guide the stock in the proper direction.

The invention consists in the novel features of construction hereinafter pointed out, and shown in the drawings, in which:—

Figure 1 is a side elevation, the chute being in normal, or pen closing position.

Fig. 2 is a similar view the chute being drawn outwardly to deliver or receive stock to or from a wagon.

Fig. 3 is a plan view, the parts being in the position shown in Fig. 2.

Fig. 4 is a vertical transverse section on the line 4—4 of Fig. 2.

In constructing the device we employ three main parts, a suitable rectangular frame 1, a chute slidable horizontally and longitudinally in the frame, and an incline 3 adapted to lead to the chute 2, when the latter is in proper receiving position, the incline 3 being covered, or closed, by the chute 2 when the chute is in normal position.

The frame 1 may be constructed in any desired manner, of wood or metal and includes two parallel fence sections 4 which serve as an inlet or passageway to or from a suitable pen or inclosure, not shown.

The upper part of the frame carries a suitable track 5. The chute 2 is supported from this track by hangers 6. This trackway and the hangers may be of the type usually employed for barn doors, the tracks being duplicated on opposite sides of the frame 1.

The chute comprises a bottom 7, sides 8 and an end member 9, being open at the inner or passageway end.

An opening about midway the ends of the chute is formed in one side member 8, and is adapted to be closed by a gate 10.

Suitable wedge-shaped blocks are placed on the inner faces of the rear posts of the frame 1.

A description of the operation of unloading a wagon by means of our chute will make the operation and use of these various parts clear.

The chute being in the position shown in Fig. 1 the wagon is driven back of the chute and through the frame, being stopped so that the rear end of the wagon just clears the back of the chute. The chute is then moved back along its overhead track and the rear end wedges between the blocks 11, which automatically stop it at the proper place.

The end gate of the wagon is removed and the hinged gate 10, which will normally lie on the chute floor, is swung through the opening $10^a$ in the side 8 and drops into the wagon. This opens a clear passage for the stock in one direction only, from the wagon to the chute and from the latter down the incline 3 and into the pen or inclosure.

As soon as the loading is accomplished the chute is shifted into normal position, and prevents egress of the stock by way of the incline 3.

What we claim is:

In a loading chute for livestock, a framework including an upper structure and horizontal tracks supported thereby and extending longitudinally, vertical supporting elements spaced apart, certain of said elements providing a wagon entrance transversely of the structure, a runway having its highest portion adjacent to one side of the wagon entrance, a horizontally movable chute having an open end and an opening in one side, a gate for closing the side opening and hinged to swing on a horizontal axis, the gate and opening affording a path of travel at right angles to the path through the chute, and means for suspending the chute from the said upper tracks and retaining it above the runway when in inoperative position, the chute being movable in a given plane longitudinally of the structure, across the wagon entrance, to operative position, and means located on that side of the wagon entrance opposite the runway for limiting the movement of the chute longitudinally and retaining it in operative position.

In testimony whereof we affix our signatures in the presence of two witnesses.

WILLIAM H. McGINNIS.
CHARLES H. BAXTER.

Witnesses:
JOSEPH H. KINNEAR,
ROBERT ANDREWS.